Patented July 13, 1954

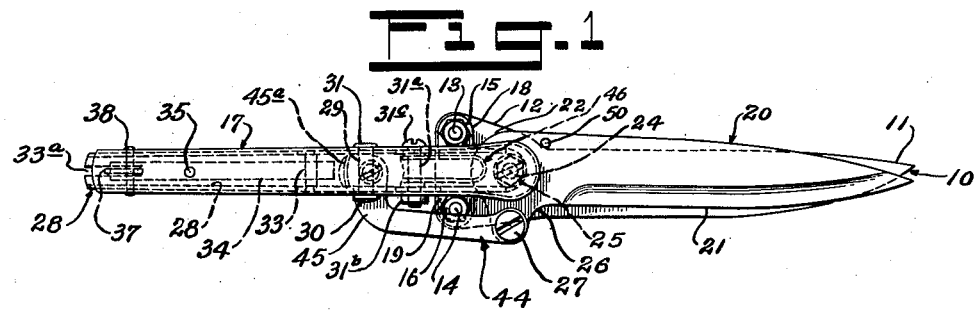

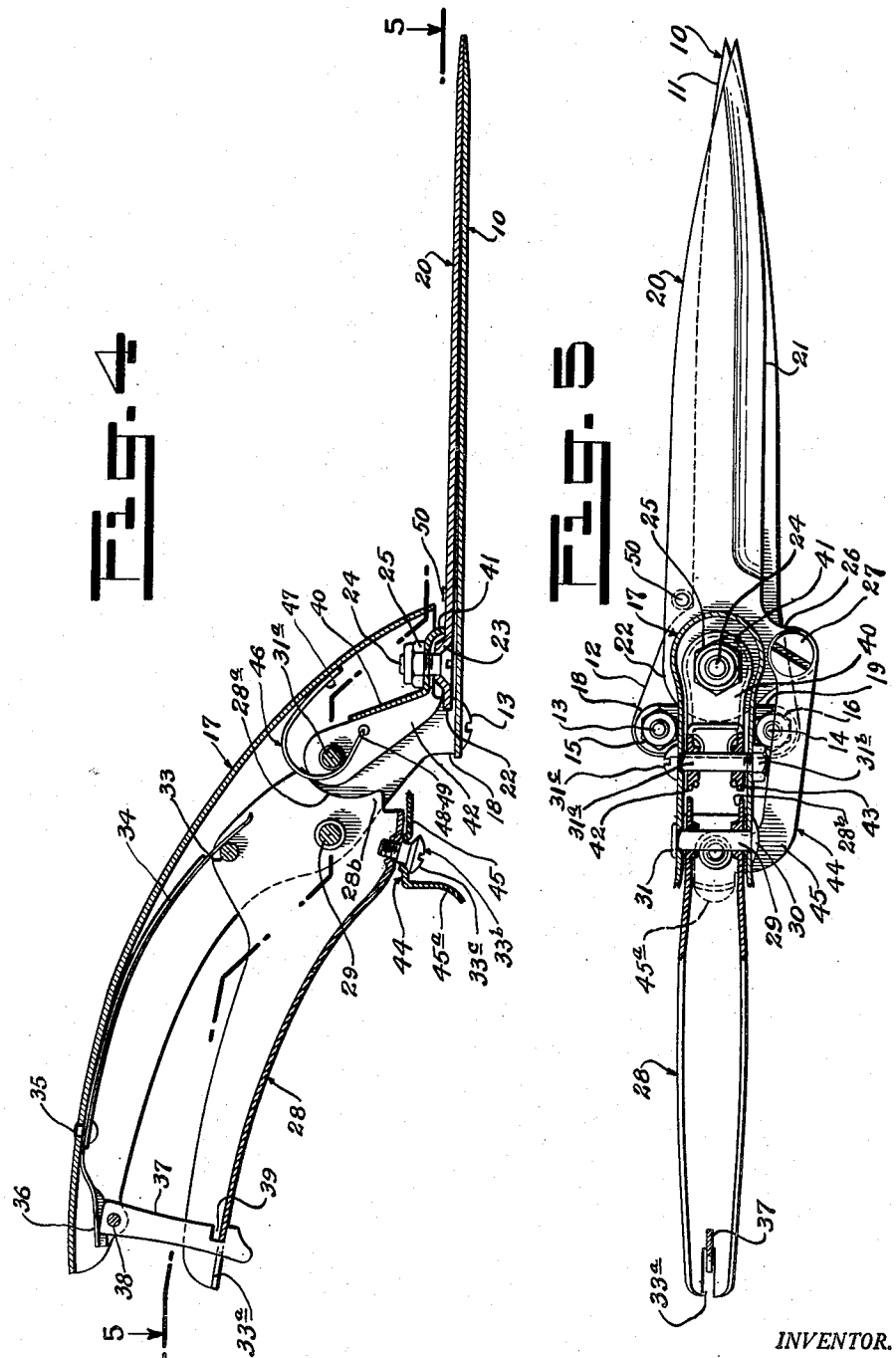

2,683,311

UNITED STATES PATENT OFFICE 2,683,311

GRASS SHEARS

Justin L. Smith, Watertown, Conn., assignor to Seymour, Smith & Son, Inc., Oakville, Conn., a corporation of Connecticut Application March 18, 1953, Serial No. 343,105

9 Claims. (Cl. 30—248)

This invention relates to garden implements and more particularly to improvements in shears adapted for trimming grass, shrubs and the like.

One object of the present invention is to provide a grass shears of the above nature having a fixed blade and a movable blade, the latter being operated by a handle which is swingable in a vertical plane.

A further object is to provide a grass shears of the above nature, in which the movable blade is mounted to swing over the fixed blade without being pivoted thereto, in such a manner that the tension between the blades will automatically be varied according to the toughness of the material to be cut.

A further object is to provide a grass shears of the above nature, which will be streamlined, provided with non-pinching handles, having a concealed opening spring, and an efficient catch for keeping the shears closed when not in use.

A further object is to provide a grass shears of the above nature which will be simple in construction, comfortable in use, inexpensive to manufacture, easy to install and manipulate, compact, ornamental in appearance, having an efficient cutting action, and durable in use.

With these and other objects in view, there has been illustrated on the accompanying drawings, one form in which the invention may conveniently be embodied in practice.

In the drawings,

Fig. 1 represents a top plan view of the improved grass shears, shown in closed position.

Fig. 2 is a similar view of the same, shown in open position.

Fig. 3 is a side view of the same, in elevation, with the handles shown locked together by the catch.

Fig. 4 is a longitudinal sectional view of the same, shown on an enlarged scale in closed position.

Fig. 5 is a transverse sectional view, taken on the broken line 5—5 of Fig. 4.

The present invention relates to that type of grass shears which is operated by a pair of handles in a vertical plane, at right angles to the horizontal cutting blades.

The present invention relates to improvements over grass shears of the type disclosed in the three prior patents to Keiser, No. 2,281,977 granted May 5, 1942; No. 2,407,237 granted September 10, 1946; and No. 2,607,114 granted August 19, 1952.

In the improved grass shears herein disclosed, the upper horizontal movable blade is actuated by a vertically movable handle member, so arranged as to have a cutting engagement with the fixed blade attached to a fixed handle. The moving blade has no direct connection to the fixed blade and is joined to the movable handle by an angular link in such a manner as to permit the moving blade to be raised or tilted in proper contact with the fixed blade throughout the entire length of cut.

In order to obtain the full benefit of the cutting action, the movable blade is automatically tensioned, and is "free floating." In other words it is so connected to the movable handle, that when the latter is being closed, the movable or "active" blade will not only swing freely over the fixed blade but also will be forcibly pressed against it at all times. Since the active blade is "free floating," the force which it exerts against the fixed blade will adjust itself automatically according to the toughness of the material being cut.

Moreover, in the improved shears herein disclosed, the blades are not pivotally connected together, but the movable blade is connected to a rockable blade holder, which in turn is pivotally joined to the fixed handle—the movable blade is also connected at its rear end to the forward end of the angular link.

The edge of the movable blade is forcibly pressed against the fixed blade, not only by the angular link, but also by a light wire spring mounted in the blade holder and engaging the inside of the fixed handle.

Referring now to the drawings in which like reference numerals denote corresponding parts throughout the several views, the numeral 10 indicates a bottom fixed blade having a pointed end and a beveled cutting edge 11. The rear end of the fixed blade 10 is apertured and widened at 12, and is rigidly connected by a pair of headed screws 13 and 14, and a pair of nuts 15 and 16, to a pair of depressed, outstanding bottom ears 18 and 19, forming part of a top channeled vertical fixed handle member 17.

Provision is also made of an upper movable blade 20 having a beveled cutting edge 21 cooperating with the beveled edge 11 of the bottom fixed blade 10.

The movable top blade 20 is provided at its rear end 22 with a central upwardly extending apertured recess 23 for receiving a short headed vertical pivot pin 24 provided with a nut 25 fitting upon an apertured cup-shaped base 41 of an angular blade holder 40, to be hereinafter described.

The rear end 22 of the movable blade 20 also has a side ear 26 apertured for connection to a vertical screw 27, which serves to pivotally attach said blade 20 to an angular horizontal link 44.

Provision is also made of an interior movable vertical handle 28 of channeled construction, which is pivotally mounted on a horizontal bolt 29 located in a pair of apertures in the forward side sections of the channeled stationary handle 17, said bolt 29 having rivet heads 30, 31, outside of said side sections. The handle 28 has a pair of stop shoulders 28a and 28b (Figs. 4 and 5) which limit the opening and closing movements of said handle by their engagement with the opposite edges of the rear of the blade holder 40.

Provision is also made of a horizontal bolt 31a extending through the side sections of the fixed handle 17 and a pair of inclined rear webs 42, 43 of the blade holder 40. The bolt 31a has a nut 31b at one end and a head 31c at its other end, outside the fixed handle 17.

In order to normally maintain the blades of the shears in open position, provision is made of a laminated leaf spring 34 pressing against a cross-pin 33 connecting the sides of the movable handle 28, said leaf spring being joined at its rear end to the top of the fixed handle 17 by means of a vertical rivet 35.

The leaf spring 34 is provided with a downwardly offset laterally arched rear extension 36 for engaging selectively upon the edge of the squared upper end of a thin handle catch 37 which is connected to the side sections of the rear portion of the stationary handle 17 by means of a small horizontal pivot pin 38.

The catch 37 is provided at its forward end with a side slot 39 which is adapted to engage within a slot 33a in the rear of the movable handle 28.

The angular blade operating link 44 is provided with an inwardly bent apertured end 45 from which depends a finger-protecting rearwardly-concave ear 45a, as most clearly shown in Fig. 4.

The inwardly extending end 45 of the link 44 forwardly of the ear 45a is connected to the curved bottom portion of the movable handle 28 by means of an inclined upstanding short screw 33b having a bottom slotted conical head 33c, as best shown in Fig. 4 of the drawing.

Provision is also made of a U-shaped light wire spring 46 having a forward loop 47 engaging the under side of the stationary handle 17, and having outstanding ends 48, 49 fitted into small apertures in the side webs 42, 43 of the blade holder 40. In order to limit the closing movement of the blade 20, a vertical stud 50 extending through the movable blade 20 is provided and is adapted to engage the edge of the fixed blade.

*Operation*

In operation, assuming the grass shears to be in the closed latched position shown in Figs. 1 and 4, the first step will be to swing the catch 37 manually in an outward direction to permit the laminated spring 34 to cause the movable blade 20 to open. The blades 10 and 20 will then be in the open position shown in Fig. 2 of the drawing, and will tend to remain in this position due to the action of the leaf spring 34.

When it is desired to cut the grass or other material with the shears, the operator will grasp the vertical handles 17 and 28 in one hand, squeezing the lower movable handle 28 upwardly, causing the blade 20 to move from the open position shown in Fig. 2 to the closed position shown in Fig. 1. During this action, the angular link 44 will swing the blade 20 about the short vertical pivot pin 24 on the blade holder 40 causing said blade 20 to move over the stationary blade 10 and sever the grass or other material located between said blades.

It will be understood that the looped wire spring 47, by its attempt to open, tends to turn blade holder 40 about the bolt 31a and thereby press said holder down upon blade 20, whereby it will insure positive engagement of the cutting edges of the blades against each other at all times, even though the handles 17 and 28 are not being pressed together by the hand of the operator.

It will also be understood that when the handles are being closed, the angular link 44 will pull upwardly upon the side ear 26 and swing the movable blade 20 about the vertical pivot pin 24 of the blade holder 40, and at the same time will rock the movable blade 20 and the blade holder 40 about the horizontal pivot bolt 31a.

The effect of this operation will be to pull the movable blade 20 down against the fixed blade 10 in such a manner that the tougher the material being cut, the greater will be the pressure between the cutting edges of the blades.

An important advantage of the improved grass shears herein disclosed, is that most of the operating parts and pivotal connections are enclosed within the channeled handle members and are thereby protected from dirt, grass clippings, etc.

While there has been disclosed in this specification one form in which the invention may be embodied, it is to be understood that this form is shown for the purpose of illustration only, and that the invention is not to be limited to the specific disclosure, but may be modified and embodied in various other forms without departing from its spirit.

In short, the invention includes all the modifications and embodiments coming within the scope of the following claims.

Having thus fully described the invention, what is claimed as new, and for which it is desired to secure Letters Patent, is:

1. In a grass shears, a pair of superimposed horizontal cutting blades, the lower of said blades being stationary and having a fixed channel-shaped handle rigidly connected thereto, the upper blade being movable and having a vertical pivot connection at its rear end to a blade holder which is connected at its rear end by means of a horizontal pivot to the sides of said fixed handle, an angular link member connected to a side ear on said movable blade and having an inwardly extending rear end connected by a flexible pivot screw to the bottom portion of a channeled movable handle member embraced by said fixed handle, whereby when the movable handle member is squeezed upwardly by the operator's hand, the movable blade will be swung over the fixed blade, without moving the stationary blade in any manner.

2. The invention as defined in claim 1, in which provision is made of a U-shaped wire spring secured to said blade holder and engaging the inside of the fixed handle for pressing said movable blade against said stationary blade.

3. The invention as defined in claim 1, in which a vertical stud is provided near the rear of said movable blade to limit the closing movement of said movable blade by engagement with the edge of said stationary blade.

4. The invention as defined in claim 1, in which a depending protecting rearwardly concave ear is provided on the lower end of said connecting link to prevent injury to the user's finger.

5. The invention as defined in claim 1, in which the blade holder is provided with an inverted cup-shaped base for embracing the head of said vertical pivot screw, said head being flush with the bottom surface of said movable blade.

6. The invention as defined in claim 1, in which the blade holder is provided with a pair of parallel spaced apart vertical webs which are apertured to receive said horizontal pivot which is connected to the sides of the fixed handle at a point forwardly of the end of the movable handle.

7. The invention as defined in claim 1, in which the connecting link for operating the movable blade is located below the pivotal connection between the movable blade holder and the fixed handle whereby the cutting pressure between the blades will be enhanced.

8. In a grass shears, a bottom horizontal stationary cutting blade, a top horizontal movable free floating cutting blade superimposed on said bottom blade and having no direct connection therewith, a fixed vertical channeled handle rigidly connected to said bottom blade, a movable vertical channeled handle embraced by and connected by a horizontal pivot to said fixed handle, an upstanding blade holder connected to the rear of said movable blade and also connected to said fixed handle by a horizontal pivot pin, and a link member connected at one end to a side ear on the rear of said movable blade, and at its other end to the bottom portion of said movable handle for swinging said free floating movable blade with respect to said stationary blade.

9. The invention as defined in claim 8, in which light spring means are mounted in said holder and engaging said fixed handle to urge the edge of said movable blade against the edge of said stationary blade at all times.

No references cited.